F. E. WATTS & A. J. NEERKEN.
VEHICLE BODY.
APPLICATION FILED DEC. 4, 1914.

1,204,523.

Patented Nov. 14, 1916.
2 SHEETS—SHEET 1.

Witnesses
E. R. Barrett
W. K. Ford

Inventors
Frank E. Watts &
Adrian J. Neerken
By
Attorneys

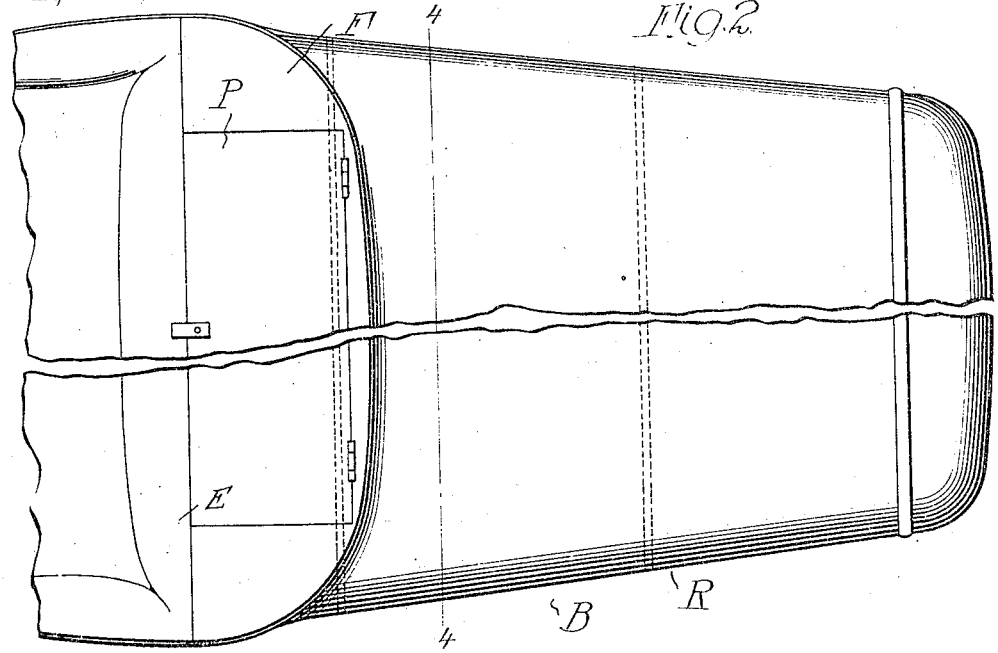
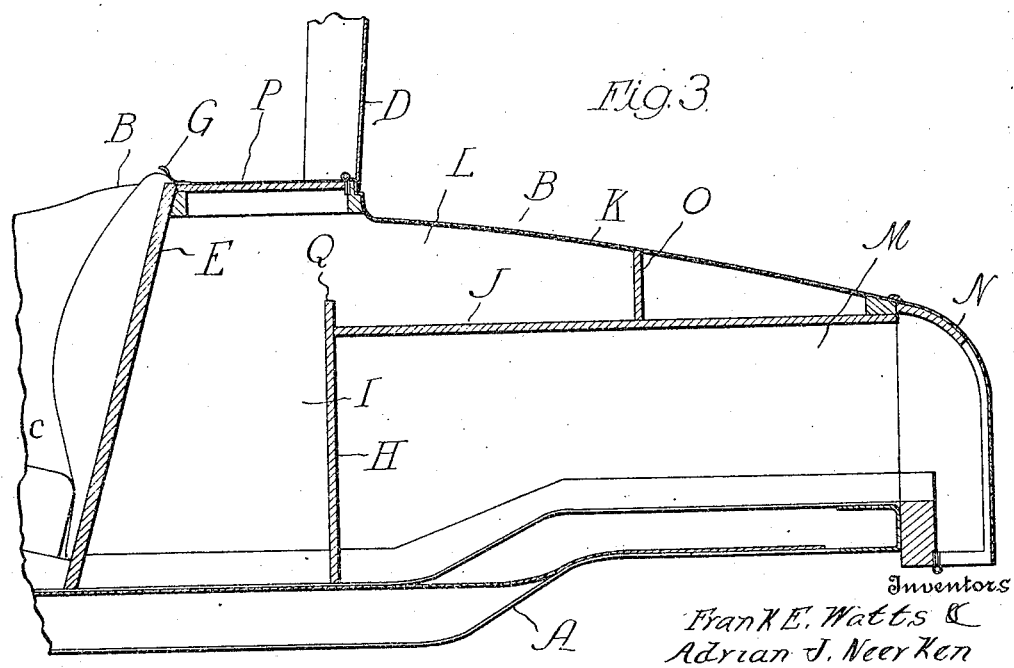

UNITED STATES PATENT OFFICE.

FRANK E. WATTS AND ADRIAN J. NEERKEN, OF DETROIT, MICHIGAN, ASSIGNORS, BY MESNE ASSIGNMENTS, TO HUPP MOTOR CAR CORPORATION, OF RICHMOND, VIRGINIA, A CORPORATION OF VIRGINIA.

VEHICLE-BODY.

1,204,523.  Specification of Letters Patent.  Patented Nov. 14, 1916.

Application filed December 4, 1914. Serial No. 875,546.

*To all whom it may concern:*

Be it known that we, FRANK E. WATTS and ADRIAN J. NEERKEN, citizens of the United States of America, residing at Detroit, in the county of Wayne and State of Michigan, have invented certain new and useful Improvements in Vehicle-Bodies, of which the following is a specification, reference being had therein to the accompanying drawings.

The invention relates to vehicle bodies and more particularly to a construction of body for an automobile of the roadster, coupé or like type.

The invention has among the objects thereof to provide a suitable clearance between the back of the seat and the back of the top, and to so construct the portion of the body in rear of the seat as to provide a plurality of article-carrying compartments; further, to so arrange said compartments that access may be had from the seat to one or more of the compartments.

Other objects of the invention will more fully hereinafter appear.

The invention resides in the peculiar construction, arrangement and combination of parts as hereinafter set forth and as particularly pointed out in the claims.

For the sake of clarity we will illustrate and describe the invention in connection with an automobile body of the roadster type, though we do not desire to limit the invention to this particular type of vehicle body.

Figure 1:
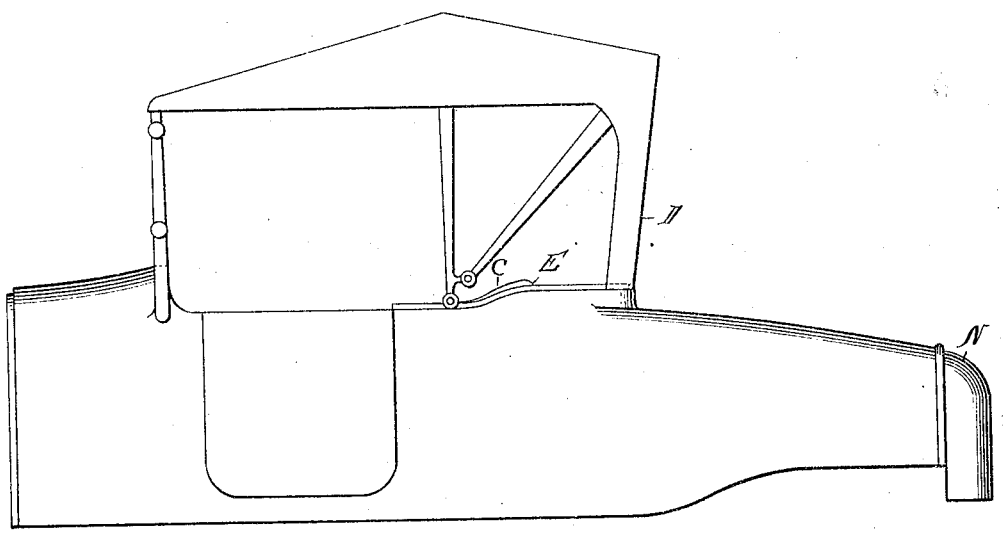
Figure 4:
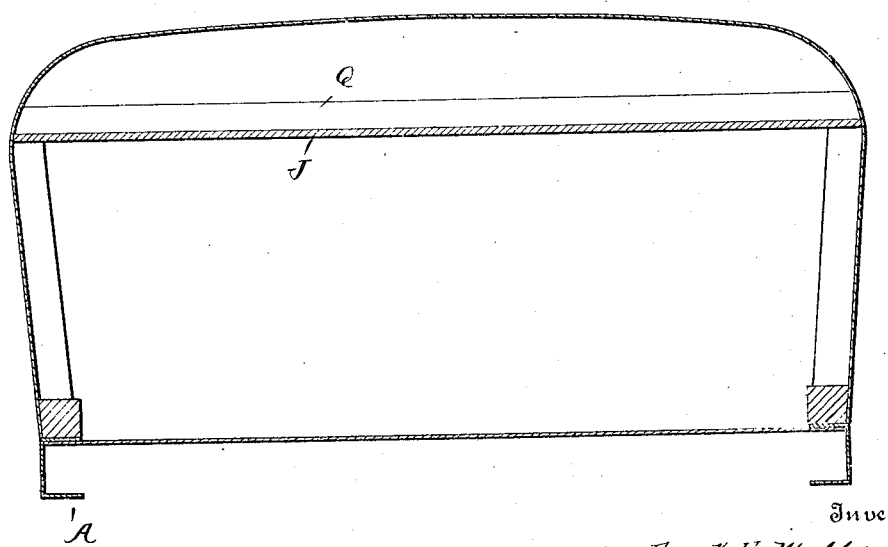

In the drawings, Figure 1 is a side elevation of a device embodying the invention; Fig. 2 is an enlarged top plan view; Fig. 3 is a longitudinal, central section of the structure shown in Fig. 2; and Fig. 4 is a section on the line 4—4 of Fig. 2.

Referring to the one embodiment of the invention shown in the drawing, A designates the chassis of an automobile and B a roadster body having a seat C.

D is the back of the top, which is spaced some little distance from the back E of the seat C. The space between the back of the top and the seat is closed at the top by means of a member F that extends from side to side of the body and is arranged substantially on the level with the upper edge G of the seat back. The portion of the body in rear of the seat, or what is commonly known as the "deck" is inclosed, and this inclosure is divided into a plurality of compartments. Thus H is a vertically-arranged partition extending from side to side of the body and this partition is spaced from the back of the seat, forming a chamber I directly beneath the member F.

J is a horizontal partition extending from the partition H to the rear of the body portion and arranged adjacent the top K of the deck but spaced therefrom, forming a compartment L. The space below the partition J forms a comparatively large compartment M which may be used for carrying the spare tire or tires, or the like.

N is a door at the rear of the body portion, providing access to the chamber M. Intermediate the partition J and the top K is a third partition O which also extends from side to side of the body portion and serves to restrict the depth of the chamber L.

Access to the chamber I is had through a door P in the member F and this door also provides access to the chamber L, since the upper edge Q of the partition H is spaced from the top K of the deck. As will be readily apparent, the chamber I is of considerable size and forms a suitable compartment accessible from the seat, for carrying comparatively large articles or packages, while since the chamber L is restricted in depth, the smaller articles or packages placed therein are readily accessible through the door P. As will be noted upon reference to Fig. 3, the upper edge of the partition H extends a slight distance above the horizontal partition J or bottom of the chamber L and, therefore, serves as a retainer, preventing the articles in the chamber L from falling down into the chamber I. As before stated, the partitions H, J, and O extend from side to side of the body portion. These partitions are secured to the metal covering R of the deck, performing the additional function of reinforcing the rear portion of the vehicle body.

While the construction shown and described is a very desirable form of the invention, it is not desired to limit the protection to the particular structure illustrated.

What we claim as our invention is:—

1. A vehicle body provided with a seat and having a portion of the body in rear of the seat inclosed, a reinforcing partition extending transversely of said portion of the body and spaced from the back of the seat forming a compartment therewith, means for closing the compartment at the top, including a door, and a shelf in rear of said compartment and accessible from the seat through said door.

2. A vehicle body provided with a seat and having an inclosure in rear of the seat, an upwardly-extending reinforcing partition extending transversely of the inclosure and spaced from the back of the seat, forming therewith a compartment, and a horizontal reinforcing partition arranged in rear of the first-mentioned partition adjacent the top thereof, forming a shelf, the first-mentioned partition extending for a portion only of the height of said inclosure and having a part extending above said horizontal partition, forming a guard.

3. A vehicle body provided with a seat, a top having the back thereof spaced from the back of the seat, a member extending across the body intermediate the back of the seat and the back of the top, said body being provided with a chamber below said member, and a door in said member providing access to said chamber, a deck extending rearwardly from the back of the top, and a compartment beneath said deck accessible through said chamber.

4. A vehicle body provided with a seat, an inclosure in rear of said seat, an upwardly-extending partition extending from side to side of said inclosure and spaced from the back of the seat forming a compartment, a horizontal partition extending from said vertical partition to the rear of the inclosure and of a width to extend from side to side of the body, said horizontal partition being arranged adjacent but spaced below the top of said inclosure forming a comparatively large compartment, a third partition arranged above the horizontal partition extending from side to side of the body and positioned in rear of the first-mentioned partition, a door at the rear of said inclosure providing access to the second compartment, and a door in the first-mentioned compartment providing access thereto and to the space above the horizontal partition.

5. A vehicle body provided with a seat, a top having the lower edge of its back spaced rearwardly a comparatively wide distance from the upper edge of the seat back, and a member extending across the body substantially from side to side thereof and extending from the back of the seat to the back of the top, a deck extending rearwardly from the back of the top, and a compartment beneath said deck.

In testimony whereof we affix our signatures in presence of two witnesses.

FRANK E. WATTS.
ADRIAN J. NEERKEN.

Witnesses:
 DON T. HASTINGS,
 GRANVILLE C. ALDRICH.